United States Patent [19]

Wallace

[11] Patent Number: 4,601,623

[45] Date of Patent: Jul. 22, 1986

[54] FASTENER SYSTEM AND METHOD

[76] Inventor: John Wallace, 16521 Le Grand La., Huntington Beach, Calif. 92649

[21] Appl. No.: 447,319

[22] Filed: Dec. 6, 1982

[51] Int. Cl.⁴ ............................................. F16B 39/22
[52] U.S. Cl. ......................................... 411/336; 411/1; 411/8
[58] Field of Search ...................... 411/1, 2, 3, 4, 5, 6, 411/7, 8, 9, 10, 276, 277, 278, 281, 282, 333, 334, 335, 336, 360, 361

[56] References Cited

U.S. PATENT DOCUMENTS

| | | | |
|---|---|---|---|
| 445,166 | 1/1891 | Elliot | 411/336 X |
| 495,520 | 4/1893 | Sayre | 411/336 |
| 930,450 | 8/1909 | Zinow | 411/277 |
| 1,892,119 | 12/1932 | Thompson | 411/336 |
| 2,923,339 | 2/1960 | Skidmore | 411/277 |
| 4,005,740 | 2/1977 | Villo | 411/167 |
| 4,176,582 | 12/1979 | Witte | 411/7 |
| 4,260,005 | 4/1981 | Stencel | 411/281 X |

FOREIGN PATENT DOCUMENTS

| | | | |
|---|---|---|---|
| 1228099 | 3/1960 | France | 411/282 |
| 895237 | 5/1962 | United Kingdom | 411/282 |
| 985714 | 3/1965 | United Kingdom | 411/282 |

*Primary Examiner*—Thomas J. Holko
*Attorney, Agent, or Firm*—Knobbe, Martens, Olson and Bear

[57] ABSTRACT

A fastener system is disclosed comprising a nut having an axial bore provided with interior thread and a bolt having exterior thread for engagement with the interior bore of the nut. The nut has an end portion having an elliptical cross section for engaging a complementarily shaped driver. As the nut is tightened onto the bolt against a workpiece, resistance to further threading increases. When sufficient resistance to threading occurs, the driver will deform the elliptically shaped end portions of the nut, forcing material of the nut radially inward toward the axis of the nut. The portion of the bolt which engages the nut has a plurality of recesses for receiving the deformed material of the nut as it flows radially inward, thereby locking the nut, bolt, and workpiece together. The recesses of the bolt have a shoulder for abutting the deformed material to prevent unthreading of the nut from the bolt.

8 Claims, 9 Drawing Figures

FASTENER SYSTEM AND METHOD

BACKGROUND OF THE INVENTION

The present invention relates to fasteners in general and in particular to locking systems comprising a nut and a bolt which lock together when tightened against a workpiece.

Many applications, such as encountered in shipbuilding and aircraft and railroad car manufacturing, require fasteners that have high locking forces. It is, therefore, critical that the nut and bolt assembly hold together under heavy loads and working conditions in which the assembly is subjected to vibrational and other fluctuating stresses. Typically, in such manufacturing processes, pre-set powered torque wrenches are employed on assembly lines to sequentially apply large quantities of lock nuts to corresponding bolts. The lock nuts are tightened to a predetermined torque.

Various devices have been employed in the past to lock a nut and bolt together. One method is to deform the threads of the nut so that they bear in radial compression against the threads of the pin. This deformation may occur before or after the nut is set. One example is shown in U.S. Pat. No. 2,940,495 issued to G. S. Wing, which discloses a lock nut with a frangible drive portion that is sheared off after a predetermined torque is reached, leaving a portion of the fastener tightened onto the bolt with a predetermined and known torque. In manufacturing, the nut is distorted out of round by application of force on diametrically opposed points, producing an elliptical cross section. Once the nut is set, the deformed threads of the nut bear in radial compression against the threads of the pin. The resistance to unthreading is purely frictional.

Such fasteners have several disadvantages. If the nut is deformed prior to assembly with the bolt, the threading operation is more difficult due to the out-of-round configuration of the nut. If the deformation occurs after the nut is set, an additional field step is required to effect the deformation. Moreover, the holding force generated by the deformation of the nut is purely frictional. In the Wing fastener, the fact that a section of the nut is sheared off during application creates a multitude of scrap pieces which must be removed from the environment.

Another approach is disclosed in U.S. Pat. No. 4,260,005, issued to Stencel. Stencel discloses a nut or collar having at least one lobe extenting radially outward on the outside of the collar. The lobe has an external surface for engagement by the driver. As the collar is threaded onto the bolt or pin, resistance to threading increases. At a predetermined load, the lobe deforms radially inward and diplaces material of the body ahead of the deforming lobe into the axial bore of the collar, thereby locking the collar and pin together. The pin has a plurality of axially extending flat surfaces of smaller diameter than the major diameter of the pin, which provide void volumes for receiving the deformed material of the collar.

The Stencel device also suffers from a number of disadvantages. The lobes of the Stencel collar abruptly change the outer configuration of the collar. As a result, the lobes can shear from the collar with a sufficient tangential component of force. Thus, the Stencel disclosure warns that the relationship between the driver and lobes during the development of the lock should be one that produces radial failure of the collar in the zone of the lobes and not shearing of the lobes from the collar. Secondly, the lobes make it difficult to register an automatic power torque wrench which is rotating at high revolutions per minute upon contact with the collar. Finally, the tooling for the collar is relatively expensive.

As a result, there remains a need for a self-locking fastener system in which a nut can be applied to a bolt that will lock together after a predetermined torque is reached, effectively, efficiently, without waste of material and without expensive tooling.

SUMMARY OF THE INVENTION

A novel fastener system is disclosed which obviates many disadvantages of prior self-locking systems. The system comprises a locking nut or collar which has a central axial bore with interior threads for engaging the exterior threads of a bolt or pin. The locking nut has a lower base portion which seats flush against the work piece and an upper end portion which is engaged by a driver.

The outer contour of the end portion has an out-of-round cross-sectional shape which is advantageously elliptical. The socket which engages the nut has a complimentary shaped interior bore.

The bolt of the system has exterior threads of any desired major diameter. However, the upper bolt portion has a plurality of circumferentially spaced recesses. Each recess is defined by a shoulder having a convex curve which extends radially inward and a concave curved portion which extends radially outward between the base of the shoulder and the non-recessed, major diameter portion of the end of the bolt.

In practice, the socket wrench, having an ellipitical bore, engages the elliptically-shaped top portion of the nut. The wrench is rotated either manually or automatically.

Initially, the nut threads easily onto the bolt. However, as the nut is tightened against the workpiece, the wrench meets some resistance to turning. At a predetermined load, the nut is set and additional turning of the wrench begins to deform the out-of-round material of the upper portion of the nut. This material which is under radial compression produced by the wrench, deforms and flows radially inward toward the bolt. The recesses of the bolt receive the material producing a tight interference fit between the nut and bolt.

The deformed material, therefore, fills the void volume produced by the recesses in the upper end portion of the bolt. Moreover, the shoulders of the recesses serve an important function. The recesses are advantageously formed so that each shoulder is located in either a clockwise or counter clockwise direction of its corresponding concave portion, depending upon whether the thread of the bolt is left or right hand. With a right hand thread on the bolt, each shoulder is located in a counter clockwise direction of its corresponding concave portion. In order to unthread the nut from the bolt, the nut must be turned in a counter clockwise direction. However, the shoulders of the recesses abut the deformed material of the nut and thereby resist unthreading of the nut in this direction. For a left hand thread, the shoulders of the recesses are located in a clockwise direction relative to a corresponding concave portion. As a result, an extremely tight lock is effected.

The fastener system of the invention, therefore, offers a number of advantages over prior systems. The lock achieved between the nut and bolt is secure, due not only to the deformaton of material of the nut, but also to the "one-way" resistance to unthreading produced by the abutment of the deformed material of the nut with the shoulders of the bolt recesses. The lock is therefore an improvement over the Stencel fastener which simply has recessed, flat sections on the bolt which receive the deformed material.

Secondly, the elliptical contour of the nut is easier to manufacture than the lobes of the Stencel fastener. There is no danger of portions of the nut being sheared off by the turning of the wrench as is the case with lobes. Moreover, the elliptical cross-section allows for easy registration of the socket with the nut.

Finally, there is no scrap material produced as the lock is effected as with the Wing fastener system. In short, the inventive fastener system achieves a reliable, effective locking mechanism. These and other advantages will be discussed and amplified with reference made to the drawings defined below.

DESCRIPTION OF THE PREFERRED EMBODIMENT

Figure 1:
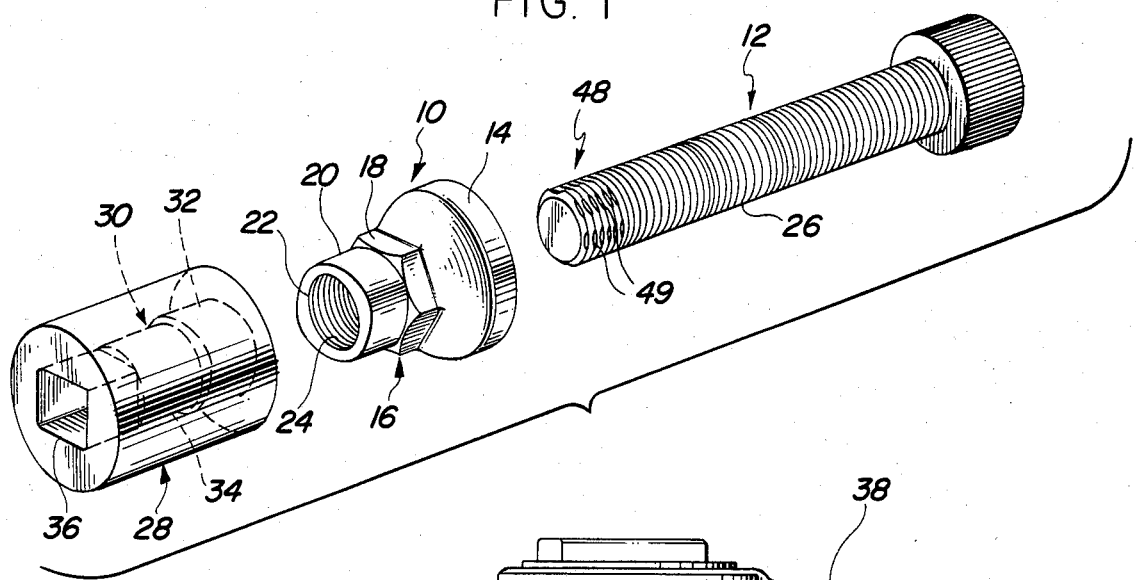
FIG. 1 is an exploded perspective view of the invention.
Figure 3:
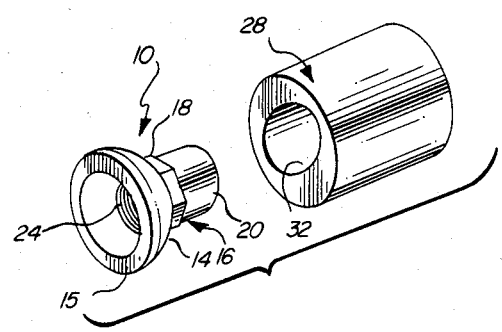
FIG. 3 is an exploded perspective view of a lock nut included in the fastener system of the invention and a socket wrench for driving the lock nut.

FIGS. 1 and 3 illustrate a lock nut 10, configured to be driven by a socket wrench 28 into locking engagement with a bolt 12.

The lock nut 10 has a central axial cylindrical bore 22 therethrough with interior threads 24 being formed in the bore 22 for engagement with the bolt 12.

The lock nut 10 is preferably manufactured from ferrous or nonferrous metals such as aluminum alloy, alloy steel, steel/titanium alloy, nickel-based alloys and other types of high-strength, high-temperature alloys. The nut may be heat treated to the tensile strength required depending upon the material employed and the application for the fastener system.

Although an integral piece of metal, the lock nut 10 can be conceptualized as having a base 14, a central portion 16 and a head or end portion 20. The base 14 has a generally cylindrical contour with a flat bottom 15 (shown in FIG. 3). The central portion 16 preferably includes wrench engaging means such as an ordinary hexagonal head 18. The central portion 16 may have any suitable contour such as round, elliptical, hexagonal or 12-point configuration. The threads 24 need not extend throughout the length of the nut 10. As most clearly shown in FIG. 3, the portion of the bore 22 at the base portion is unthreaded.

The head portion 20 extends axially over a significant portion of the overall length of the nut 10. Thus, in the preferred embodiment, the head portion 20 represents over one-third of the axial length of the nut 10.

The outer circumference of the head portion 20 is out-of-round in contour as is the inner circumference of the head portion 20 defined by the bore 22. It should be understood that the outer contour of the end portion 20 is a continuous, smooth, out-of-round curve. Other shapes such as oblong or oval would be suitable. The contour, however, should not possess any abrupt changes in contour which produce stress points that could be sheared off in setting the nut. Due to he out-of-round configuration, the wall thickness of the head portion 20 will have points of minimum and maximum thickness. The wall thickness of the head portion 20 gradually and continuously increases between these points of minimum and maximum thickness. Thus, the wall thickness throughout the circumference is gradually and continously changing between the maximum and minimum points. In the preferred embodiment, the contour of the outer configuration of the end portion 20 is elliptical. Thus, the end portion 20 has a major (horizontal) diameter of greater length than a minor (vertical) diameter. The wall thickness at the point of minor diameter will be a minimum. Conversely, the wall thickness of major diameter will be a maximum. Between the points of minimum and maximum diameter, the wall thickness of the head portion 20 gradually and continuously increases. The cold working of the head portion 20 in the formation of the out-of-round exterior contour produces a fine grain structure in the metal, thereby increasing its strength.

Figure 6:
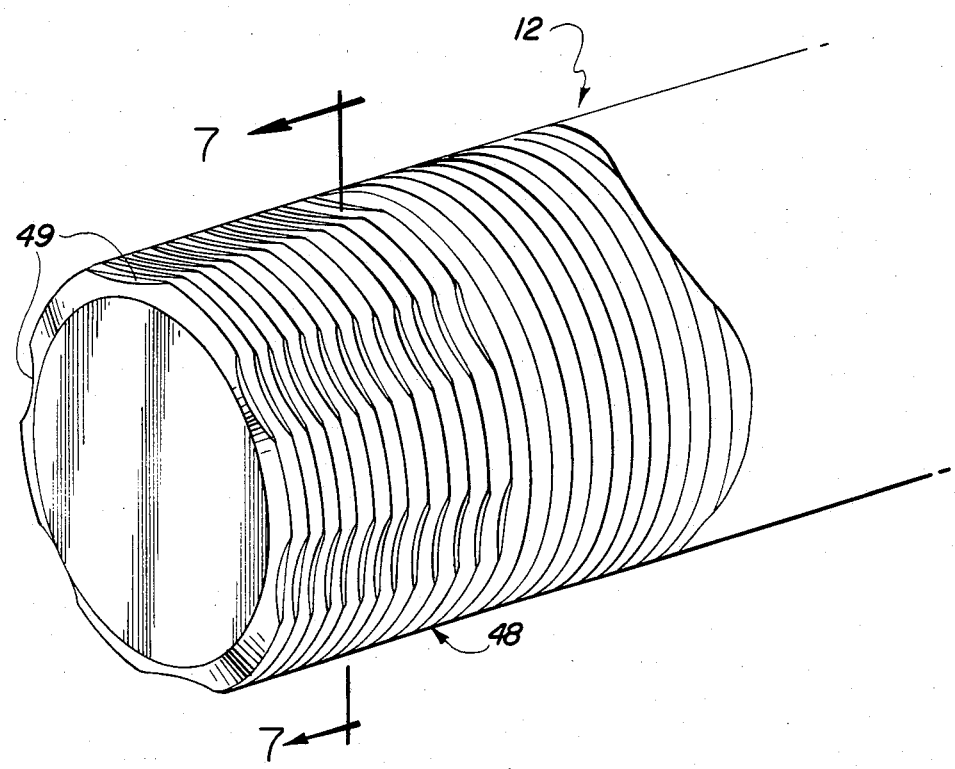
FIG. 6 is a perspective view of the recessed end portion of the bolt included in the fastener system of the invention.

Referring to FIGS. 1 and 6, the bolt 12 has a threaded portion 26 which is threaded with any desired major diameter to receive the lock nut 10 thereon. An end section 48 has a plurality of axially extending recesses 49. Preferably, there are between 3-15 recesses 49, depending upon thread size. In the embodiment shown, the six recesses 49 are circumferentially spaced 30 degrees apart. Each recess traverses about 30 degrees of the circumference of the bolt 12. The axial length of the end section 48 is sized to be compatible with the axial length of the head portion 20 of the nut 10. Thus, the axial length of the end section 48 of the bolt 12 is approximately equal to he length of the head portion 20 of the nut 10.

Figure 7:
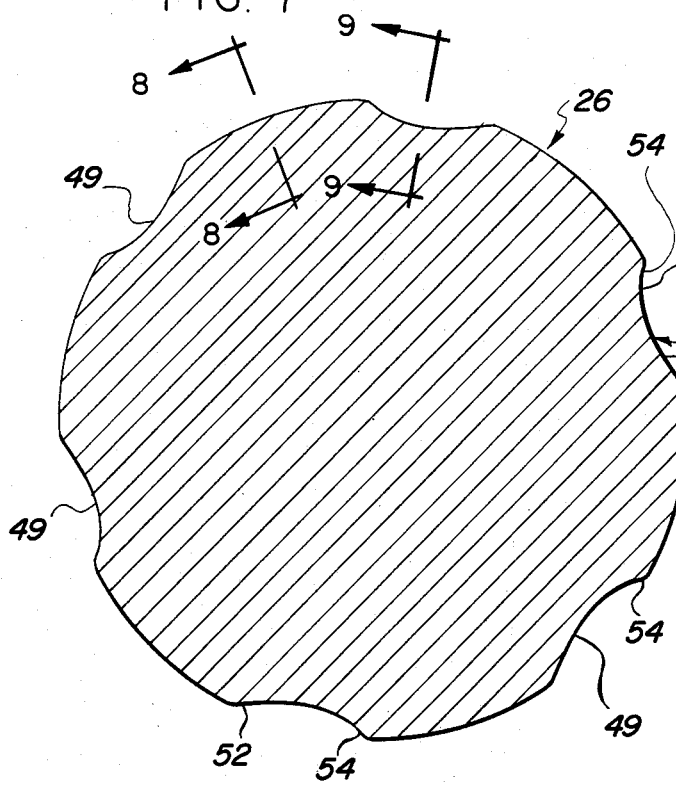
FIG. 7 is a cross sectional view taken along line 7—7 of FIG. 6.
Figure 8:
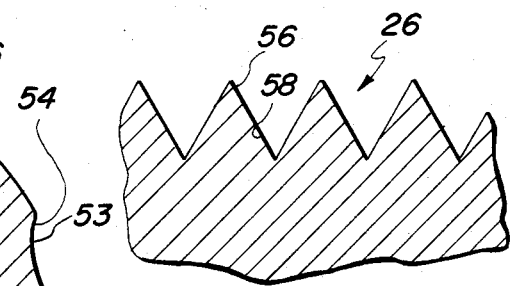
FIG. 8 is a cross sectional view taken along line 8—8 of FIG. 7.

FIGS. 6 through 8 illustrate the structure of the end portion 48 of the bolt 12 according to a preferred embodiment of the invention. The recesses 49 are defined by a shoulder 54 which extends radially inward from the major diameter threaded portion 26. The shoulder 54 as a confguration defined by a convex curve. A shallow concave curved portion 52 extends between a base 53 of the shoulder 54 and an adjacent major diameter threaded portion 26a. The shoulders 54 extend radially inward at a greater acute angle than the concave curved portions 52. As a result, the shoulders 54 define a relatively abrupt abutting surface.

As shown most clearly in FIG. 7, each of the shoulders 54 of each recess 49 is located in a counterclockwise direction to its corresponding concave portion 52. This will be true if the threads 24 and 26 of the nut 10 and the bolt 12, respectively, are right hand. If the threads 24 and 26 are left hand, the location of each shoulder 54 will be in a clockwise direction relative to its corresponding concave portion 52.

Figure 9:
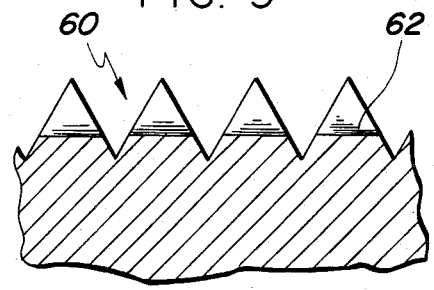
FIG. 9 is a cross sectional view taken along line 9—9 of FIG. 7.

FIGS. 8 and 9 show the relation between the recesses 49 and the threads 26 of the bolt 12. As shown in FIG. 8, the threads 26 may be formed of alternating, triangular projections 56 and triangular troughs 58. Referring to FIG. 9, the recesses 49 include threads 60 therein formed of a plurality of projections 62 having generally trapezoidal cross-sections and troughs 64, which have generally triangular cross-sections like the troughs 58. The diameter of the bolt 12 in the area of the projections 62 of the recesses 49, is therefore less than the major diameter of the threads 26.

Figure 4:
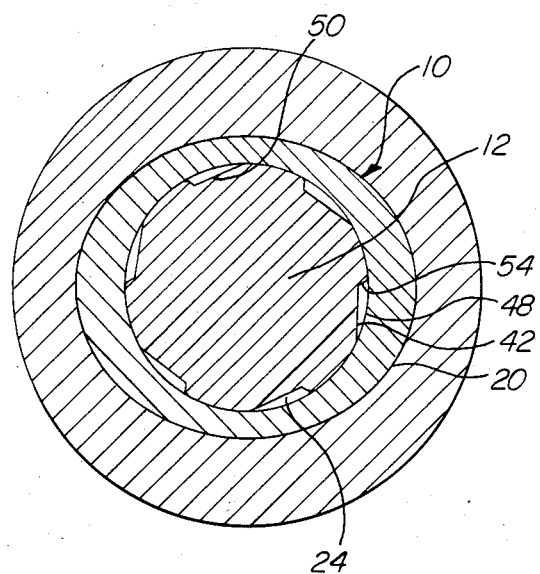
FIG. 4 is a cross sectional view taken through line 4—4 of FIG. 2 showing a lock nut and bolt according to the invention in threaded engagement before deformation of the nut.

The bolt 12 is manufactured from a cylindrical blank having a diameter before rolling the thread which is smaller than the desired major diameter of the resulting bolt. The top portion of the blank is formed to produce recesses of a general contour as that of the recesses 49 as shown in FIG. 4. The blank is then rolled and the thread 26 formed. This threading expands the outer diameter of the blank to major diameter proportions, as is well known. The bolt 12 is thereby produced.

Referring again to FIGS. 1 and 3, the socket wrench 28 is illustrated, which may be advantageously used to drive the lock nut 10 on the bolt 12. The socket wrench 28 has a stepped axial bore 30 therethrough with a first step 32 being configured to fit closely upon the deformable head portion 20. A central portion 34 of the bore 30 is sized to permit the threaded portion 26 of the bolt 12 to project into the socket wrench 28 as the lock nut 10 is advanced onto the bolt 12. The socket wrench 28 also includes a recess 36, preferably having a square cross-section sized to fit a conventional socket driver 38 (shown in FIG. 2). It should be understood that the socket can be driven internally or externally by the drivers with any suitable mating relationship between socket and driver.

The circumference of the first step 32 defined by the bore 30, is complimentarily contoured to fit the contour of the head portion 20 of the nut 10. Thus, advantageously, the contour of the first step 32 is elliptical, but may be other smooth, out-of-round, continuous curves as discussed above with respect to the configuration of the end portion 20 of the nut 10.

The threading operation of the nut 10 onto the bolt 12 will now be described with reference to FIGS. 2, 4 and 5.

Figure 2:
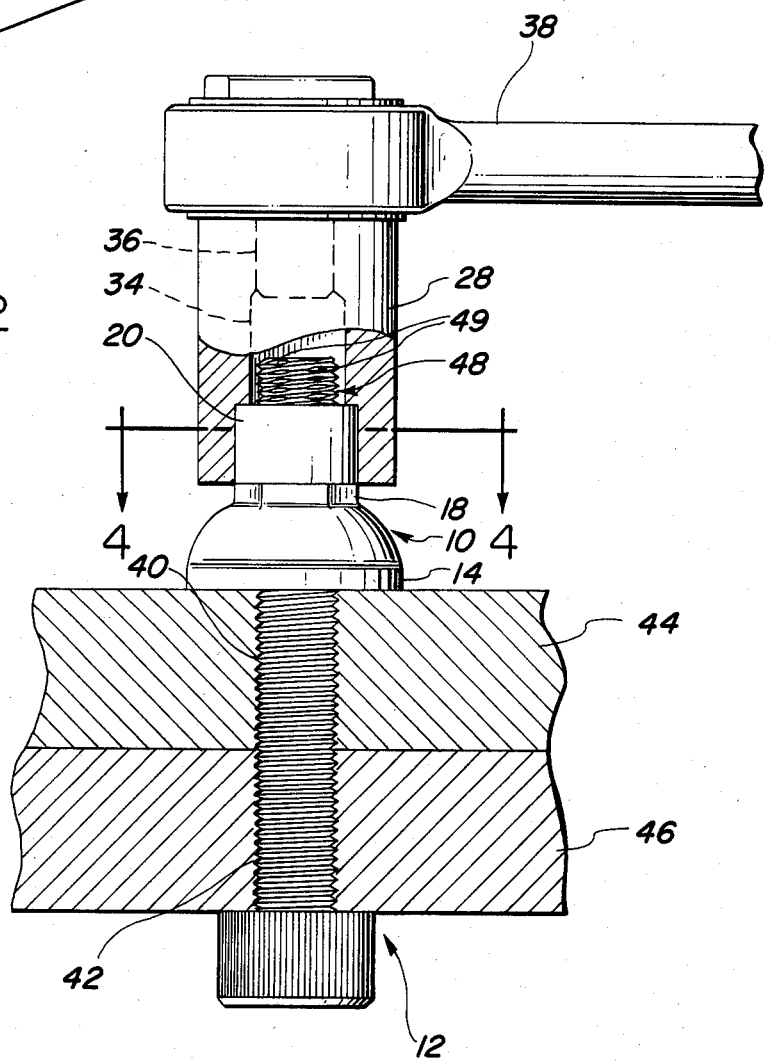
FIG. 2 is a partial cross sectional view showing means for attaching a lock nut according to the invention to a bolt to form a joint.

Referring first to FIG. 2, the bolt 12 is inserted through a pair of aligned bores 40 and 42 in a pair of work pieces 44 and 46, respectively, which are to be fastened together. As used herein, the term "bolt" is to include other types of male fasteners such as studs. The length of the bolt 12 relative to the thickness of the work pieces 44, 46, must be such that the end portion 48 of the bolt 12 extends beyond the work pieces 44, 46. The nut 10 is then threaded onto the bolt 12 by means of the socket 36 and the driver 38. Since in high-volume assembly lines, the drivers are rotating at high r.p.m., the fact that the first step 32 and the head portion 20 of the nut 10 are complementarily contoured, allows for easy and fast registration of the socket with the nut. This is particularly true in the preferred embodiment when the first step 32 of the socket 28 and the head portion 20 of the nut 10 are elliptical.

Initially, there is little resistance to the threaded operation. This is an advantage over fastener systems in which the nut is deformed prior to threading, since such deformation makes it more difficult to thread the nut.

FIG. 4 illustrates the nut 10 threaded onto the bolt 12 prior to high resistance of the nut to threading due to tightening against the work pieces 44, 46. FIG. 4 illustrates that when the end portion 48 is engaged with the threads 24 of the lock nut 10, there are a plurality of cavities 50 formed between the recesses 49 of the end portion 48 and the threads 24 of the lock nut 10.

At a predetermined torque, continued turning of the lock nut 10 with the socket wrench 28 causes the head portion 20 of the lock nut 10 to be compressed radially inward toward the bolt 12. The material and dimensions of the lock nut 10 are chosen so the deformation of the deformable head portion 20 occurs at a predetermined and specified torque. As the socket wrench 28 begins to deform the out-of-round head portion 20 of the nut 10, the outer configuration of the head portion 20 acts as a kind of smooth camming surface for the wrench 28, insuring that deformation will occur and preventing the possibility that portions of the head portion 20 could be sheared off by continued rotation of the wrench 28. Thus, the gradual and continual increase in wall thickness of the head portion 20 insures a smooth deformation of the nut 10 without the danger of shearing. Since the wall thickness continuously increases over the circumference of the head portion 20, a substantial portion of the circumferential length of the exterior is deformed. Thus, in excess of about 80% of the circumference is smoothly deformed without shearing. Preferably, in excess of 50% of the circumference and, most preferably, in excess of 80% of the circumference is deformed. This is in sharp contrast to prior systems having a few abrupt lobes in which a small percentage of the circumference is abruptly deformed and may produce shearing.

The recesses 49 in the bolt 12 provide means for receiving the deformed material of the head portion 20. This deformed material moves radially inward, producing a tight interference fit between the nut 10 and the bolt 12.

Figure 5:
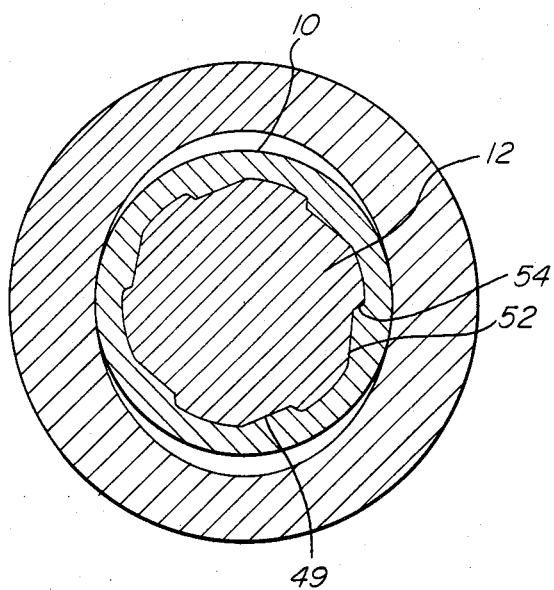
FIG. 5 is a cross sectional view showing the lock nut and bolt of FIG. 4 in locking engagement after deformation of the nut.

FIG. 5 shows the head 20 after deformation has moved material from the head 20 into the cavities 50. Deformation of the head portion 20 compresses the threads 24 of the nut 10 against the threads 26 at the end portion 48 of the bolt 12. After deformation, the head 20 of the nut 10 tends to have a nearly circular cross-section as shown in FIG. 5, rather than the elliptical cross-section of FIG. 4. The volume of the cavities 50 is calculated to be large enough to receive the volume of material of the head portion 20 which is deformed, i.e., in the preferred embodiment, that material which is at a greater diameter than the minor diameter of the ellipse.

It will now be understood that the deformed material of the nut 10 abuts each of the shoulders 54 of the recesses 49. With right hand threads 24, 26, the nut 10 must be turned counter-clockwise for unthreading. However, the shoulders 54 resist counter-clockwise rotation of the nut 10 after deformation of the head 20. The combination of the deformed head 20 and the recesses 49, permits rotation of the head 20 to advance the nut 10 onto the bolt 12 while providing resistance to rotation which would tend to remove the nut 10 from the bolt 12.

The fastener system therefore provides a tight lock, not only from the interference fit of the deformed nut with the bolt, but also from the configuration of the recesses 49 which further resist unthreading of the nut in a given direction. If the threads 24, 26 are left hand, the location of the shoulders 54 relative to the concave portions 52 will be reversed.

I claim:

1. A fastener system comprising:
   a nut having an axial bore with interior threads;
   a bolt having exterior threads for engagement with the interior threads of said nut,
   said nut having a head portion having a rotatable camming surface engageable by a driver, said camming surface of said head portion having an out-of-round exterior contour defined by a continuous, smooth curve, a substantial portion of the circumference of said head portion being nonresiliently deformable radially inward upon application of a predetermined torque to said camming surface by said driver as the nut is tightened on the bolt, such that with deformation, the material of the nut is displaced radially inward into the axial bore of the nut for engagement with the bolt to lock said nut and bolt together, the contour of said continuous curve of said camming surface producing smooth deformation of said head portion without shearing.

2. The system of claim 1, wherein said threaded portion of said bolt has means for receiving said deformed material of the nut and wherein said head portion has points of maximum and minimum wall thickness, said contour having a gradual and continuous increase in wall thickness between said minimum and maximum points.

3. The system of claim 2, wherein said receiving means has means for resisting unthreading of the nut from the bolt.

4. The system of claim 3, wherein said resisting means comprises at least one recess, said recess having means for abutting said deformed material to provide resistance to the turning of said nut in the direction of unthreading to prevent said nut from unthreading from said bolt.

5. The system of claim 1 wherein in excess of about 50% of said circumference is deformed.

6. The system of claim 5 wherein in excess of about 80% of said circumference is deformed.

7. A fastener system comprising:
   a nut having an interiorly threaded axial bore; and
   a bolt having an exterior threaded portion for engagement with the threaded bore of the nut,
   said nut having a rotatable camming portion engageable by a driver, said camming portion having an exterior cross-sectional configuration of an out-of-round continuous curve said camming portion being nonresiliently deformable radially inward upon application of a predetermined torque thereto as said nut is tightened on said bolt, such that with deformation, the material of said nut is displaced radially inward into the axial bore of said nut for engagement with said bolt, said threaded portion of said bolt including a plurality of radially spaced recessed therein, each of said recesses having a shoulder portion extending radially inward to said threaded portion of said bolt, and a shallow portion extending from the base of said shoulder to an adjacent major diameter of said threaded portion, the deformed material of said nut projecting into said recesses so that abutment of said deformed material with said shoulders provides resistance to rotation which would tend to unthread said nut from said bolt while said shallow portions permit rotations to thread said nut onto said bolt until application of a predetermined locking torque to said nut.

8. A fastener system comprising:
   a nut having an interiorly threaded axial bore; and
   a bolt having an exterior threaded portion for engagement with the interior bore of the nut,
   said nut having a camming portion engageable by a driver, said camming portion having an exterior cross sectional configuration of an ellipse and being deformable radially inward upon application of a predetermined torque by said driver as the nut is tightened on the bolt, such that with deformation, the material of the nut is displaced radially inward into the axial of the nut for engagement with the bolt, said threaded portion of said bolt having means for receiving said deformed material of the nut to lock said nut and bolt together.

* * * * *